United States Patent [19]

Frederick

[11] Patent Number: 5,060,389
[45] Date of Patent: Oct. 29, 1991

[54] SEMICONDUCTOR DEVICE INSPECTION TEMPLATE

[76] Inventor: Thomas J. Frederick, 7125 E. Port Au Prince Pl., Tucson, Ariz. 85710

[21] Appl. No.: 298,383

[22] Filed: Jan. 18, 1989

[51] Int. Cl.⁵ .................................................. G01C 9/10
[52] U.S. Cl. ...................................... 33/1 BB; 33/297
[58] Field of Search ............... 33/1 B, 1 BB, 1 D, 1 C, 33/545, 297, 298, 562; 350/257, 110, 114–116, 529, 531, 532, 534, 535, 562, 565, 560; 356/377, 247, 397, 394, 395, 392

[56] References Cited

U.S. PATENT DOCUMENTS

| | | | |
|---|---|---|---|
| 679,779 | 8/1901 | Pierpont | 33/297 X |
| 1,182,384 | 5/1916 | Kennedy | 350/114 |
| 2,707,418 | 5/1955 | Magnuson | 350/257 X |
| 2,853,925 | 9/1958 | Lee | 350/257 |
| 3,119,185 | 1/1964 | Gray | 33/297 |
| 3,546,778 | 12/1970 | Lepkowski | 33/297 |
| 3,942,896 | 3/1976 | Schneider | 33/297 X |
| 4,172,662 | 10/1979 | Vogel | 356/397 X |
| 4,718,767 | 1/1988 | Hazama | 356/389 |

Primary Examiner—Harry N. Haroian
Attorney, Agent, or Firm—James W. Rose

[57] ABSTRACT

A semiconductor device inspection template for use in visual inspection of semiconductor die or packages includes a selectively patterned transparent film mounted in a sleeve adapted for rapid placement and removal from an optical inspection instrument's optical tube.

9 Claims, 5 Drawing Sheets

SEMICONDUCTOR DEVICE INSPECTION TEMPLATE

BACKGROUND OF THE INVENTION

This invention relates to an inspection template for semiconductor die or packages. The image of the semiconductor device can be compared with the template to verify size, orientation, correct placement on an underlying pad, and other characteristics.

A frequent step during the manufacture of semiconductor devices such as integrated circuits is the visual inspection of the die and package. Due to the small sizes of the devices, inspection is commonly performed at an optical inspection station providing magnification, lighting, measuring rulers and instruments, and other capabilities. For example, such a station could be based on a Bausch and Lomb microscope with stereo viewing capatility, zoom magnification capability, and interchangeable lens and lighting sources. Where direct measurement with rulers or micrometers is unwieldy, it is known to use a glass reticle installed in the lens turret or eye piece tube of the microscope. The reticle provides a pattern of intersecting fine lines, or a measurement scale superimposed on the magnified image. In this way, dimensions can be observed and compared to engineering drawings or process specifications.

Reticles are commonly made from glass with the lines or scale markings deposited by chrome or aluminum coating and etching. Reticles with standard patterns and measuring scales are commonly available. Reticles with custom patterns can be obtained at much greater expense. But since a semiconductor manufacturing facility will typically be manufacturing dozens of different die and package combinations, having a custom reticle for each combination is unlikely. A reticle is commonly installed by screwing apart the optical tube of the microscope, placing the reticle within the tube and holding it in position by screwing a field adapter into the tube to hold the reticle against the eyepiece lens.

This method of semiconductor device inspection has several disadvantages. The lack of specialized reticle patterns allows errors to occur in reading and interpreting readings from the scales. In addition, a second step is then required to compare the reading to a drawing or specification. The method of installing and removing the reticles, is quite time consuming and can lead to excess wear on the threads of the microscope tube.

The glass reticles known in the art also have several disadvantages. The metal coating and etching processes used to pattern the reticles are costly. It requires specialized equipment and substantial time to produce the reticles. Being made of glass, the reticles are quite fragile, and likely to shatter if dropped onto a table top or to the floor.

SUMMARY OF THE INVENTION

In this invention, a semiconductor device inspection station is provided comprising an optical inspection instrument and a set of customized replaceable inspection templates.

In this invention, the template is a selectively patterned transparent film mounted in a sleeve adapted for rapid placement and removal from the optical inspection instrument's optical tube. The sleeve can be a compressible tube sized to fit within a microscopes optical tube, and to be held in place by the expansion of frictional support leaves. The film can be selectively patterned by photographic methods from information contained in the manufacturer's pre-existing database of die and package outlines and dimensions.

By use of a customized template appropriately patterned for each unique device, errors in reading and interpreting measurements can be avoided. By combining the image of the semiconductor device with the image of the template, an instant determination of correct size, orientation, and placement can be made.

By making the customized inspection templates from selectively patterned transparent film a great decrease in cost and a great increase in the speed of preparing a new template can be achieved. For example by creating the films photographically onto microfilm, a great reduction in fabrication costs can be achieved while obtaining high photographic resolution. The photographic process can be accomplished directly by the manufacturer with commonly available equipment in short periods of time.

By installing the films into an outer sleeve with compressible frictional support leaves, the template and sleeve can be quickly installed or removed from the optical inspection instrument.

By making the outer sleeve and support leaves compressible, potential damage and wear on the optical inspection instrument can be avoided. The film, outer sleeve, and support leaves will also be resistant to shattering or cracking if dropped.

These and other advantages should become apparent to one skilled in the art by a consideration of the following drawings, embodiments, and claims.

DESCRIPTION OF THE PREFERRED EMBODIMENTS

Figure 1:
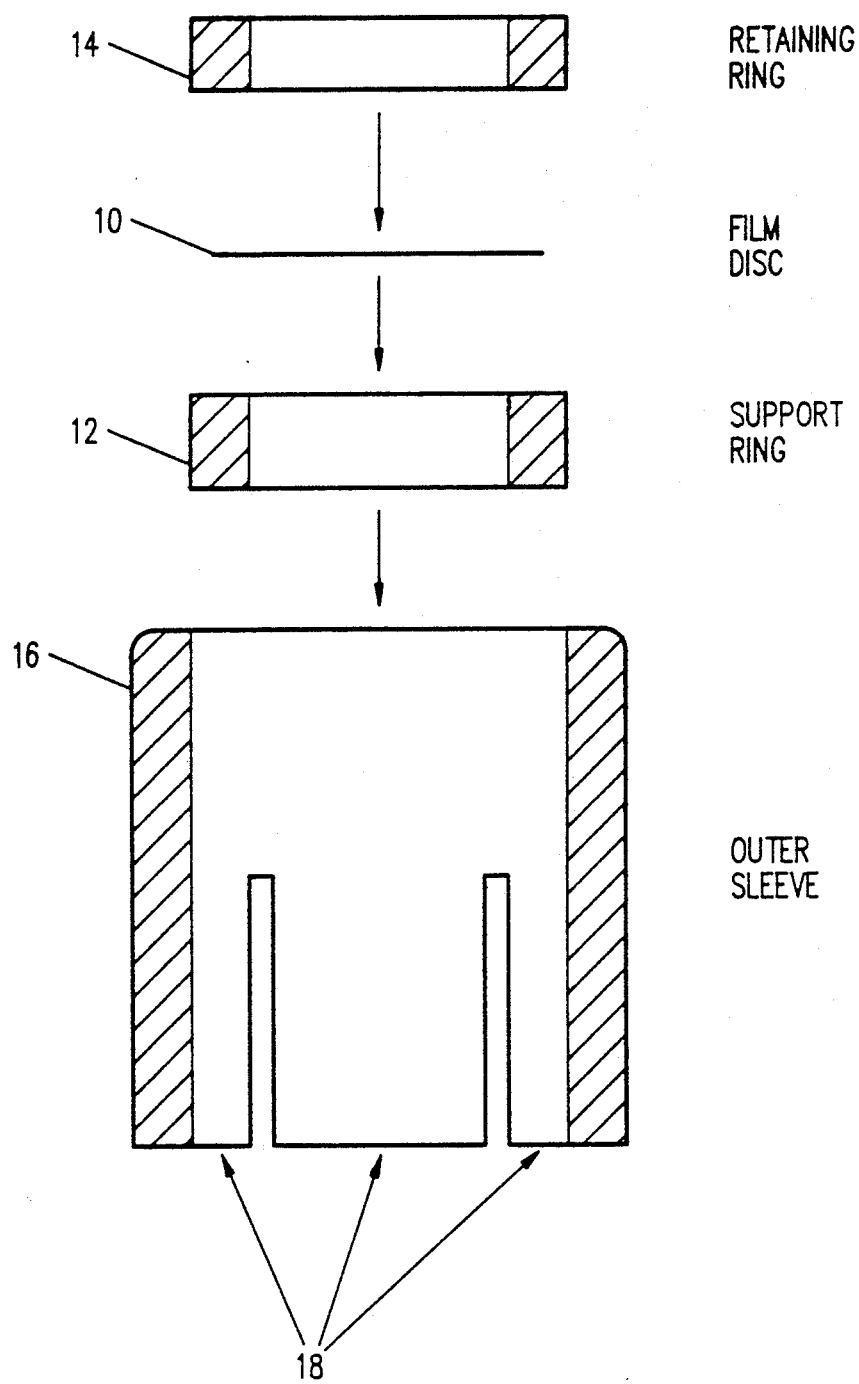
FIG. 1 shows the assembly of a customized inspection template in accordance with this invention.

FIG. 1 shows the assembly of a customized inspection template in accordance with this invention. A film disc 10 is held between a support ring 12 and retaining ring 14 for axial mounting within an outer sleeve 16.

Figure 2:
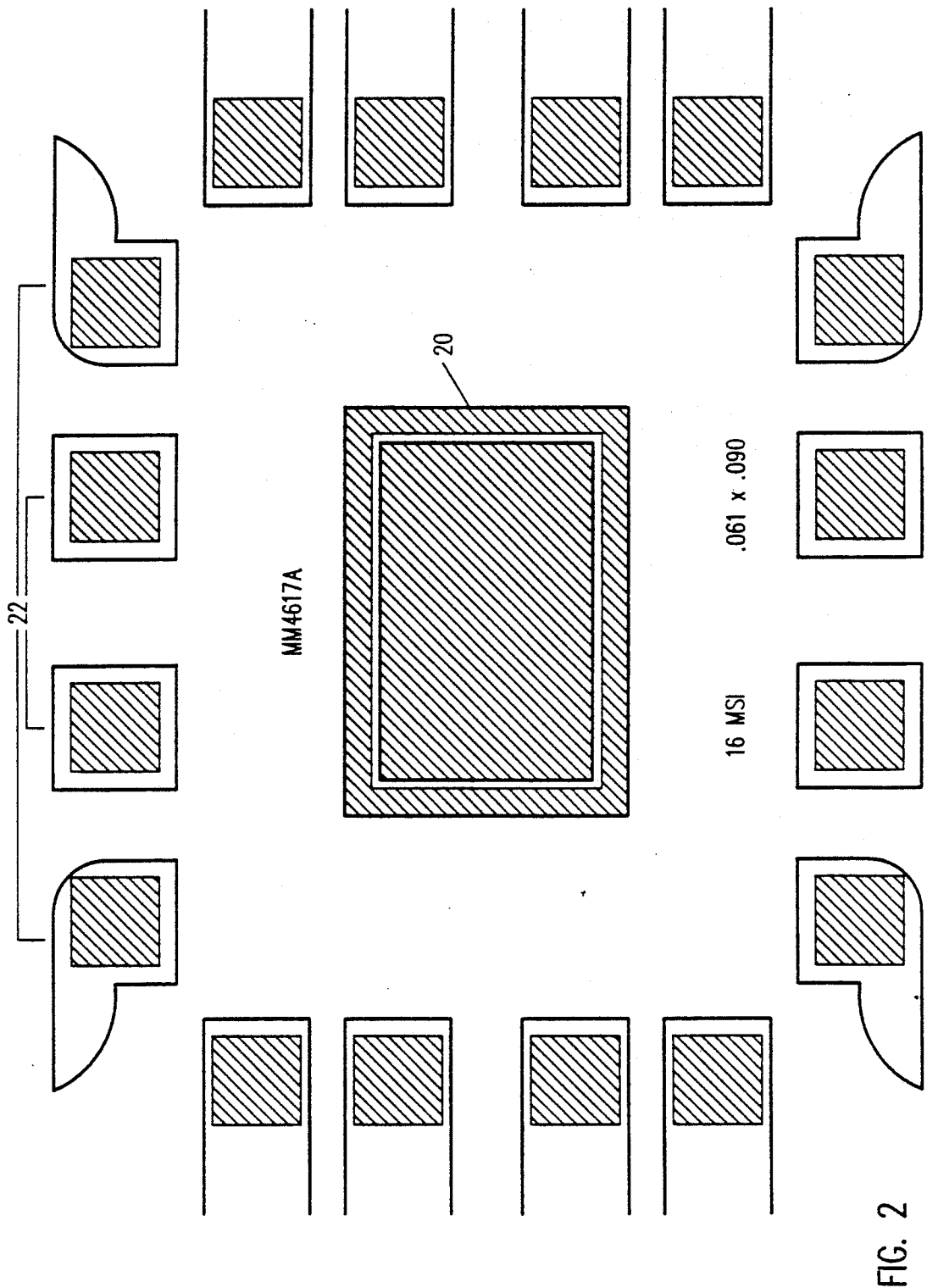
FIG. 2 shows an example inspection outline for use on the film disc of the present invention.

Film disc 10 is a selectively patterned film, such as microfilm, which may be photographically patterned with the die or package outlines or dimensions of a semiconductor device from a database of information prepared by the manufacturer in the development of each product type. The pattern on the film can be appropriately scaled in size to match the degree of magnification used in the inspection microscope. FIG. 2 shows an example inspection outline for use on the film disc of the present invention. The outline shows a central die attach area 20 and bonding pads 22. When this outline is compared with the image of an actual semiconductor device in an optical inspection station, correct placement and orientation can be easily verified. For example, if a die has been mounted outside of the die attach area 20, its edge will be visible outside of the template outline of that area.

Figure 3:
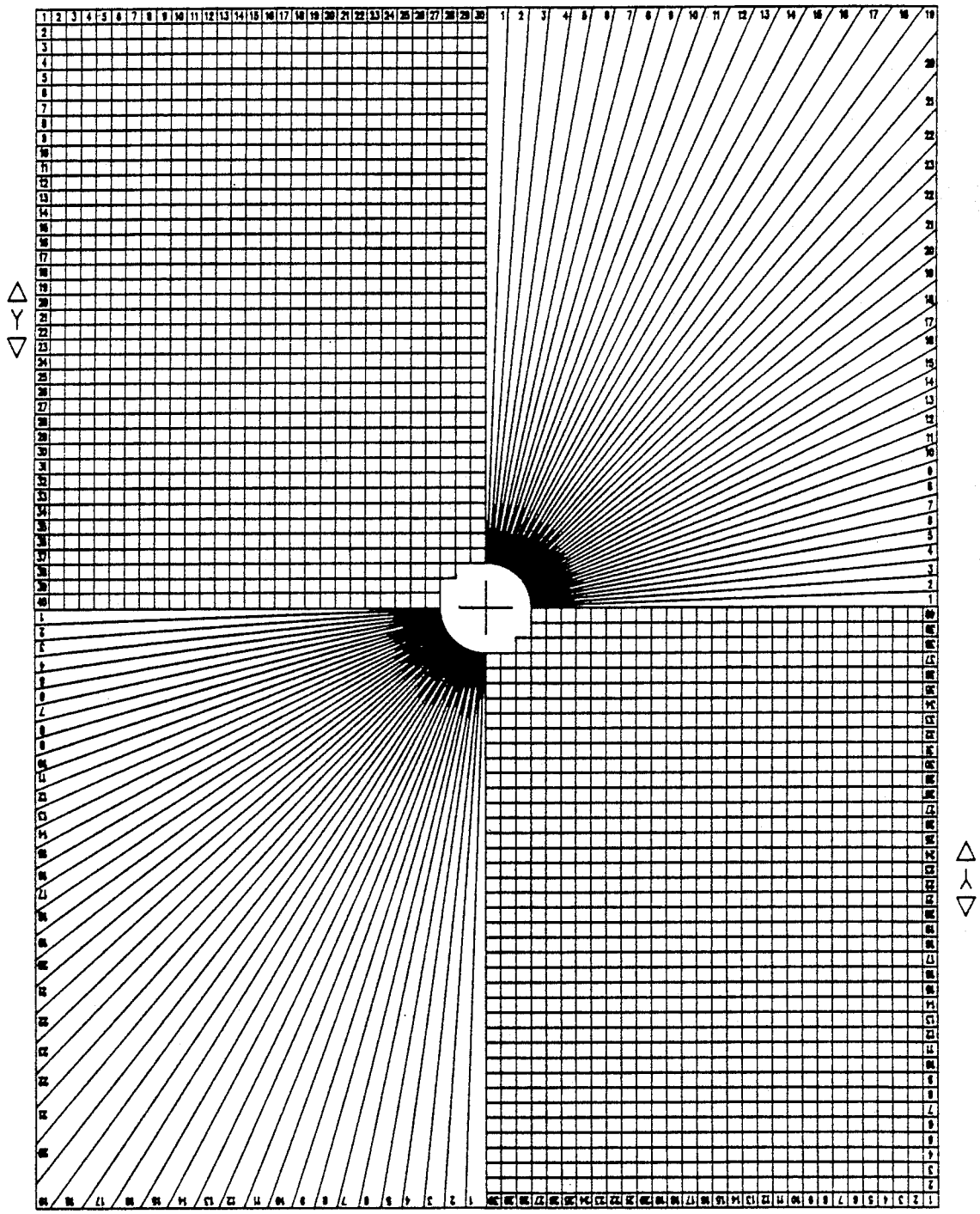
FIG. 3 shows a second example inspection pattern for verification of size and angular orientation.

FIG. 3 shows a second example inspection pattern for verification of size and angular orientation. With this pattern linear dimensions and angular measurements and alignments can be quickly verified.

Support ring 12, retaining ring 14, and outer sleeve 16 are preferably formed from an inexpensive, moldable, material such as PVC plastic tubing. Support ring 12 and retaining ring 14 restrain the film disc 10 between them. A smaller outer diameter of the film disc 10, support ring 12 and retaining ring 14 allow them to be axially mounted within the outer sleeve 16.

Outer sleeve 16 preferably has compressible frictional support leaves 18 which can expand or compress to frictionally hold outer sleeve 16 within the optical path of an optical inspection instrument, such as within the eyepiece tube of a microscope. The film disc 10 is recessed to a depth within the outer sleeve 16 to hold the film disc 10 at the proper distance from the inner eyepiece lens when the outer sleeve 16 is installed within a eyepiece tube.

In this way light traveling up the eyepiece tube will pass through the film disc 10, combining the image of a semiconductor device with the image on the film disc 10.

Because film disc, support ring and retaining ring are inexpensive, a large number of customized outlines and templates can be prepared and easily changed.

Because of the compressible frictional support leaves 18, the template can be quickly installed and removed from an optical inspection instrument without complicated threading and support requirements.

Figure 4:
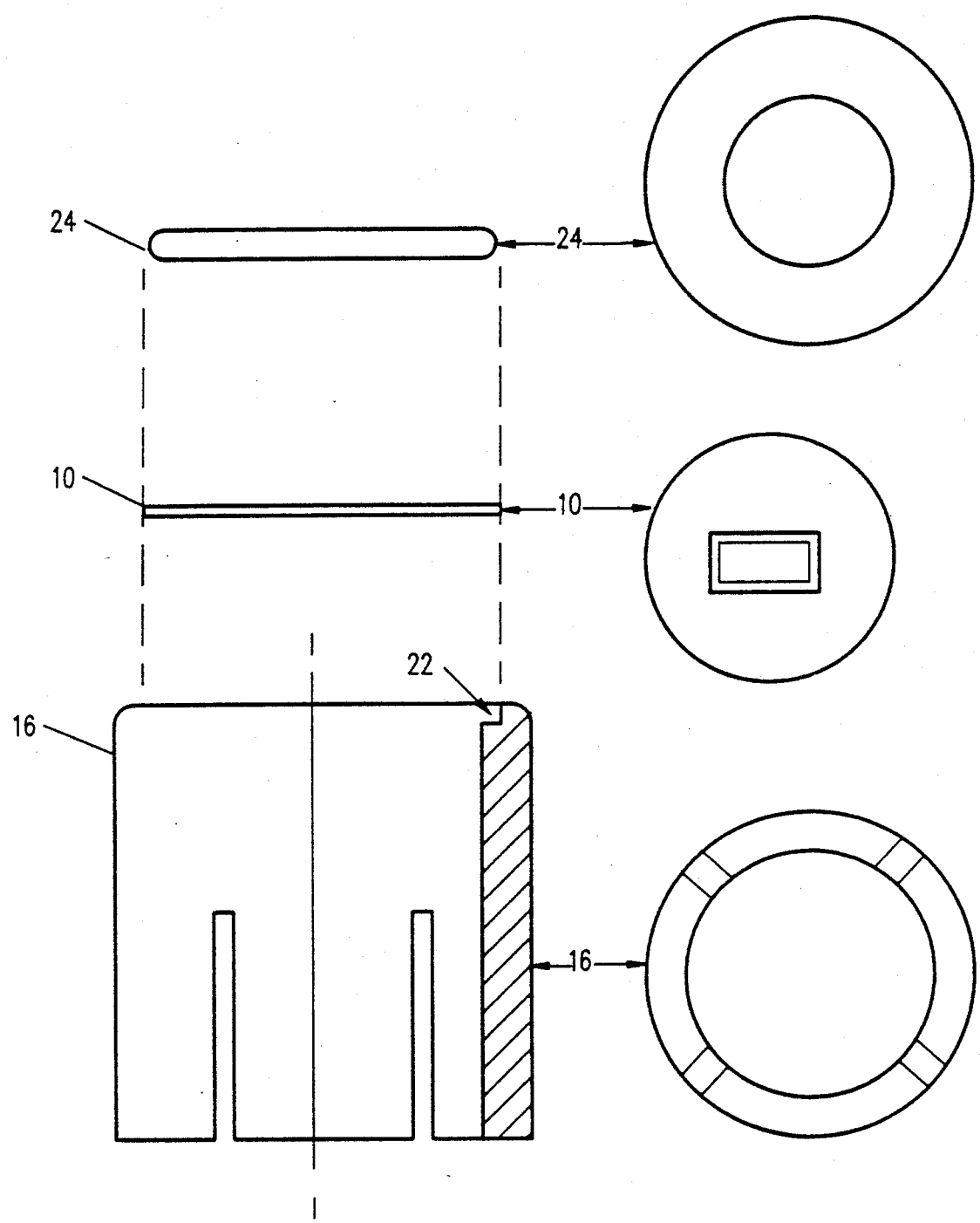
FIG. 4 shows an alternative embodiment of this invention.

FIG. 4 shows an alternative embodiment of this invention. Film disc 10 is held between a support ledge 22 formed in outer sleeve 16 and a retaining grommet 24. The use of a support ledge 22 eliminates the need for a support ring 12 as a separate component. Additionally, retaining grommet 24 can now be formed of a plastic or rubber O-ring.

Figure 5:
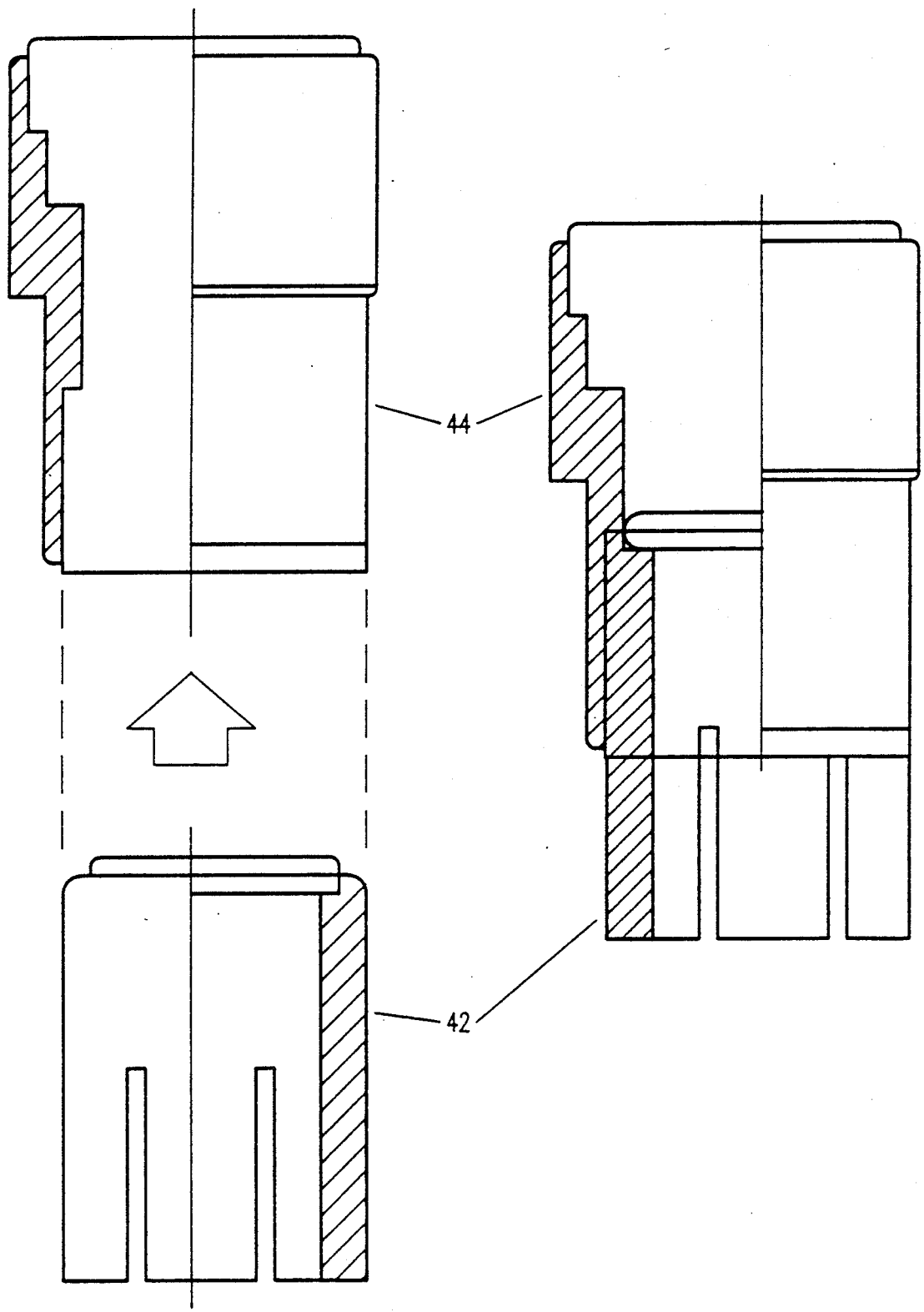
FIG. 5 shows the installation of an inspection template into the eyepiece of an optical inspection instrument.

FIG. 5 shows the installation of an inspection template 42 into the eyepiece tube 44 of an optical inspection instrument. The outer diameter of the outer sleeve is sized to frictionally hold the template 42 within the eyepiece tube 44. The frictional support is enhanced by the compressible frictional support leaves formed on the outer sleeve.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A template for placement in the optical path of an optical instrument used for inspecting a semiconductor device, the template comprising:

a transparent film patterned with selected die or package features extracted from a data base storing information related to the semiconductor device to be inspected;

a film support means supporting said film; and an outer sleeve surrounding said film support means.

2. A template as in claim 1, wherein:

said transparent film is a photographic film patterned with an image for use in linear or angular measurement or alignment verification of the semiconductor device.

3. A template as in claim 1 wherein said outer sleeve further comprises compressible frictional support leaves for holding said outer sleeve within said optical inspection instrument and allowing rapid removal and replacement of said templates.

4. A method of producing a semiconductor device inspection template from a database storing package or die features of a semiconductor device, comprising:

selecting key package or die features from the data base;

selectively patterning a transparent film with an image including elements corresponding to said key die or package features; and;

adjoining said film in a template support means to produce an inspection template.

5. The method of claim 4, further comprising the step of:

inserting said template support means into an optical path of an optical instrument used for inspecting semiconductor devices, wherein said outer sleeve positions said film a distance from the semiconductor device and in the optical path of the optical instrument.

6. A template for placement in the optical path of an optical instrument used to inspect a semiconductor device, the template comprising:

a transparent film;

an image of die or package features of the semiconductor device formed on said transparent film; and support means to support said transparent film a distance from the semiconductor device and in the optical path of the optical instrument used to inspect the semiconductor device.

7. The template of claim 6, wherein said support means further comprises a film support ring for holding said film and an outer sleeve surrounding said film support ring.

8. The template of claim 6, further comprising a sliding mount means to enable said support means to be slid onto the optical instrument so that said transparent film is positioned in the optical path of the optical instrument.

9. The template of claim 8, wherein said sliding mount means further comprises compressible support leaves for holding said outer sleeve within said optical inspection instrument and allowing rapid removal and replacement of said template.

* * * * *